July 2, 1946.  W. F. WEGST ET AL  2,403,157
MANUFACTURE OF ZINCATED ALKALIES
Filed Nov. 22, 1943  3 Sheets-Sheet 1
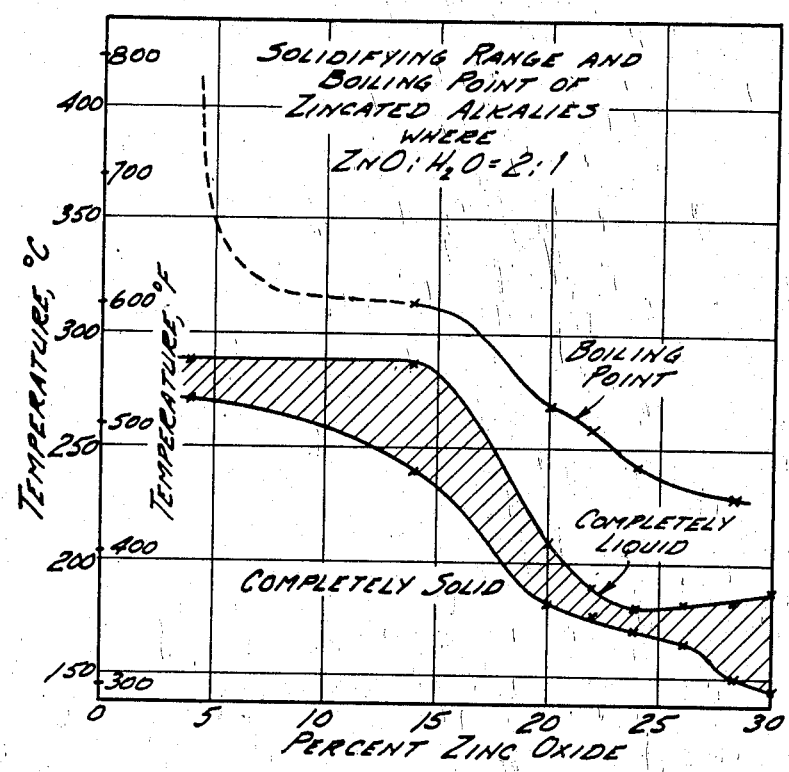
FIG. I
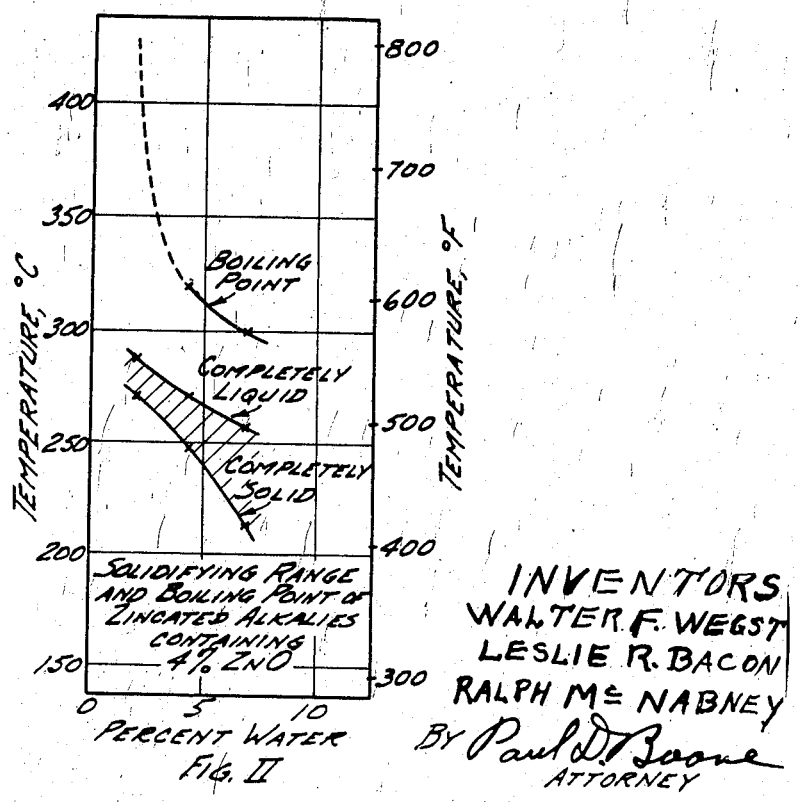
FIG. II
INVENTORS
WALTER F. WEGST
LESLIE R. BACON
RALPH M⁰ NABNEY
BY Paul D. Boone
ATTORNEY

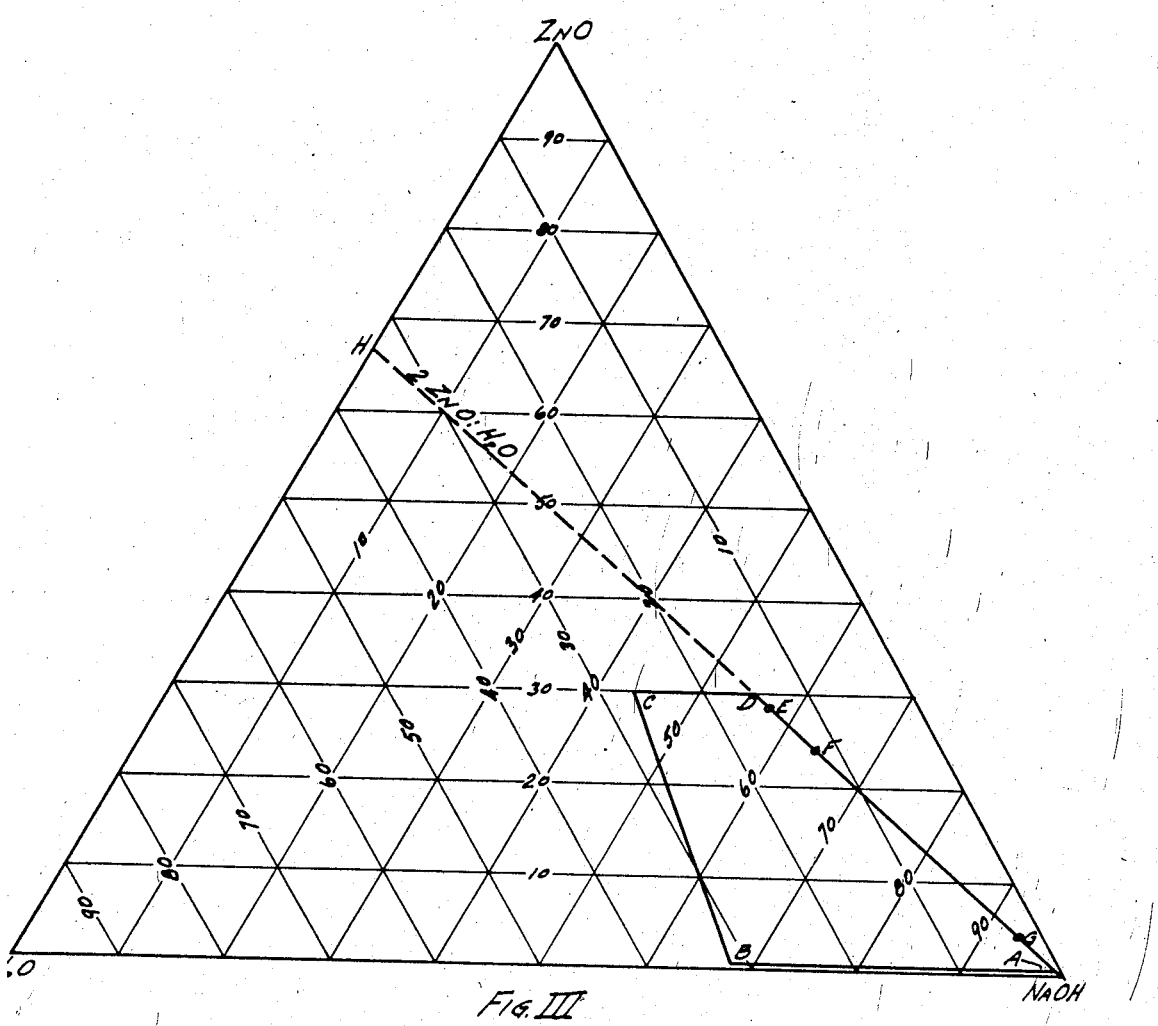
FIG. III

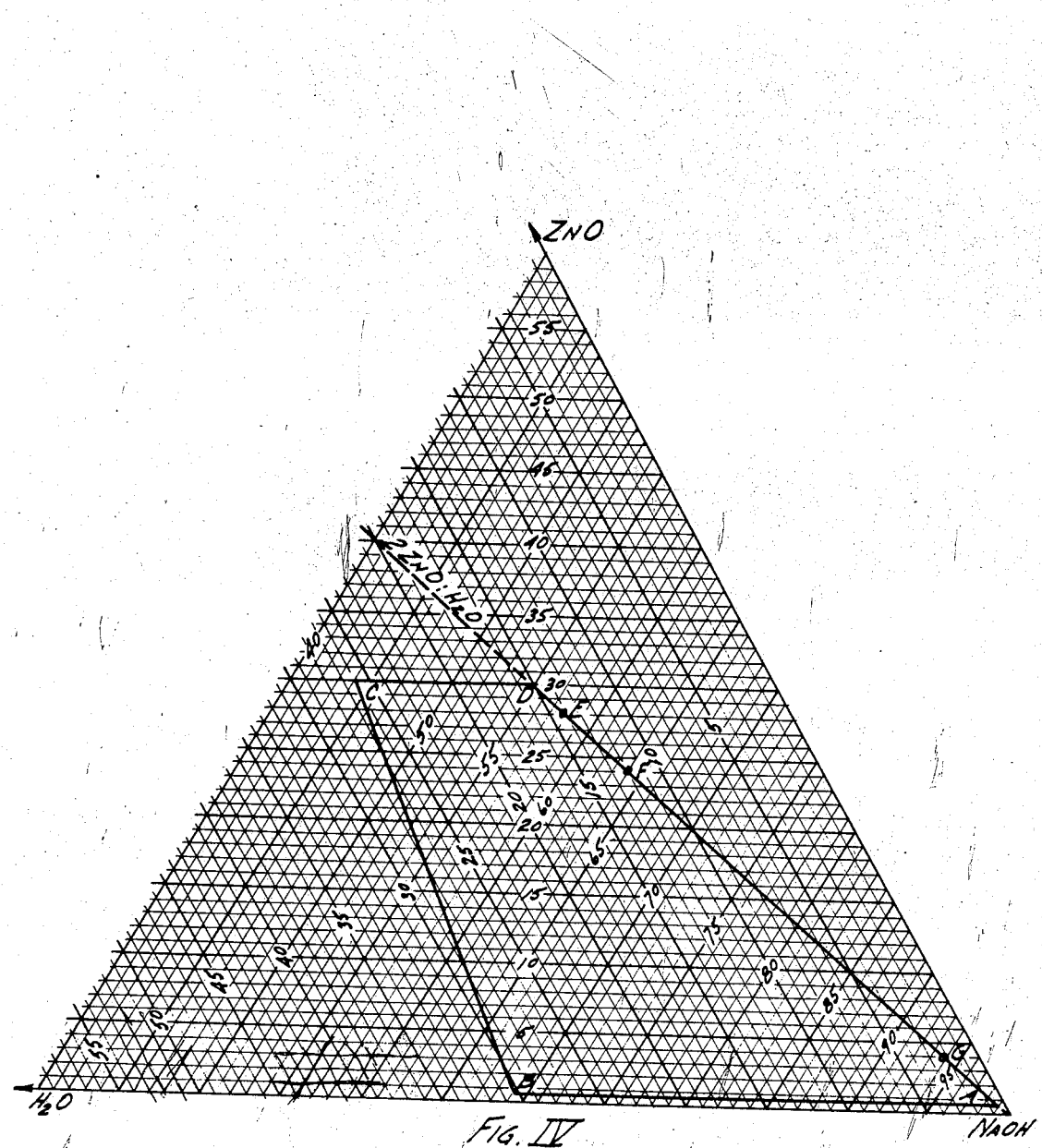

Patented July 2, 1946

2,403,157

UNITED STATES PATENT OFFICE 2,403,157

MANUFACTURE OF ZINCATED ALKALIES

Walter F. Wegst, Leslie R. Bacon, and Ralph McNabney, Wyandotte, Mich., assignors to Wyandotte Chemicals Corporation, Wyandotte, Mich., a corporation of Michigan Application November 22, 1943, Serial No. 511,244

12 Claims. (Cl. 252—156)

This invention relates to the production of zincated alkalies in a medium of caustic alkali. These materials prepared by methods described herein are unusually effective and successful in protecting glass and ceramic surfaces against attack and deterioration by aqueous alkaline solutions in commercial washing operations, as set out in co-pending application of Wegst et al., Ser. No. 425,804, "Protection of glass surface against alkali attack."

It is an object of this invention to provide a simple process for the production of zincated alkalies analyzing from a fraction of 1% ZnO up to about 30% by weight. It is more particularly an object to produce the low zincated alkalies.

It has been suggested in U. S. Patent #1,719,056 to dissolve zinc by sodium hydroxide having a concentration of 200 to 400 grams NaOH per liter, wherein the zinc concentration rises to from 100 to 200 grams per liter and during the treatment is oxidized partially at least to ZnO by a nitrate.

It has also been proposed in U. S. Patent #1,719,056 to prepare an alkali zincate from zinc oxide (from roasted zinc sulfide ore) by adding 70 pounds of NaOH in solution of 50% strength to 100 pounds of the roasted ore.

It has also been suggested in U. S. Patent #1,023,964 that solutions of sodium zincates can be prepared by dissolving zinc ore in NH4OH and this solution introduced into heated caustic soda.

Our invention comprises heating zinc oxide with hydrated molten caustic soda to obtain a solution wherein certain limits or ranges are adhered to as more fully disclosed below and set out graphically in Figure III of the accompanying drawings. This invention can be better understood with reference to the drawings and tables.

In said annexed drawings:

Fig. I is a biaxial diagram having curves thereon showing the relationship between percentage of zinc oxide and temperature in determining the boiling point, complete liquefaction point, complete solidification point of the zincated alkalies of our invention; Fig. II is a diagram similar to Fig. I, but showing the effect of a variation in water content where the zinc oxide content is constant; Fig. III is a triaxial diagram illustrating the percentage proportion zones of the constituent starting materials employed in our process; and Fig. IV is a diagram similar to Fig. III, and being a more detailed enlargement of the right hand portion thereof.

Table I below shows the approximate temperatures at which the system caustic soda, zinc oxide and water having compositions of ZnO from 4–30% and $H_2O$ from 2–15% boils, is completely liquid or is completely solid. Figure I shows a diagrammatic representation thereof.

Table II shows the behavior for zincated alkalies wherein the zincate composition in terms of ZnO remains at 4% and the percentage of water ranges between 2 and 7. Figure II is a diagrammatic representation thereof.

Figure III is a representation of the analytical composition limits of the components on a triangular co-ordinate graph.

For the purposes of this specification and claims appended thereto, we define a "zincated alkali" as the product formed by dissolving zinc oxide in molten caustic soda, wherein the ranges fall within the approximate limits represented by the points A, B, C and D of Figure III.

Hence, the analysis of the composition treated must fall somewhere within the area bounded by the points A, B, C and D of Figure III. During the heating some water is expelled or evaporated, but as explained later, this is purposely kept small and dehydration is prevented. Whether what transpires during the heating is a reaction between ZnO and caustic soda such as the formation of sodium zincate or simply solubilizing of ZnO, we are unable to say. However, we believe the former is the correct theory, but we do not intend to be bound by the theory in the claims.

The line running between points A and H in Figure III denotes that the ratio of ZnO to $H_2O$ is not greater than 2 to 1. The line CD denotes that 30% is the upper limit of the amount, by weight, (analysis) of ZnO in the composition. The line AB designates that the lower limit of the composition in terms of ZnO, by weight (analysis) is .5%. The composition represented by point C is 44% NaOH, 30% ZnO and 26% $H_2O$, and that by point B 69% NaOH, .5 percent ZnO and the balance $H_2O$, i. e. about 31%. The co-ordinates of point D are: 55% NaOH, 30% ZnO and 15% $H_2O$. The co-ordinates of point A are: almost 100% NaOH, .5% ZnO and at least one-half as much water as ZnO, i. e. by weight.

To determine the boiling points and limiting temperatures of complete liquefaction and complete solidification of various compositions, one pound batches of NaOH, ZnO and water in the proper proportions were fused in crucibles which were kept covered to minimize loss of water. For the same reason, the initial heating of the mixture was slow, allowing 1½ hours or more to fuse the zincated alkali from the raw materials.

When fusion was complete, a thermocouple was placed in the melt to measure the temperature and the melt allowed to cool slowly with frequent stirring. The temperature when the first crystals formed was observed and recorded as the temperature above which the composition was completely liquid. The mush, composed of the liquid-solid mixture, was stirred and the temperature change followed until the mass became solid. This was recorded as the solidifying point. After repeating the procedure, the material was heated up to the boiling point and the boiling temperature recorded. Data so obtained are found in Tables I and II and plotted in Figures I and II respectively.

TABLE I

Solidifying ranges and boiling temperatures of zincated alkalies

| Composition | | | Completely solid | Completely liquid | Boiling point |
|---|---|---|---|---|---|
| NaOH | ZnO | H₂O | | | |
| Percent | Percent | Percent | °C. | °C. | °C. |
| 55 | 30 | 15 | 146 | 182 | |
| 58 | 28 | 14 | 150 | 178 | 228 |
| 61 | 26 | 13 | 164 | 178 | |
| 64 | 24 | 12 | 168 | 177 | 245 |
| 67 | 22 | 11 | 174 | 190 | 259 |
| 70 | 20 | 10 | 180 | 209 | 272 |
| 79 | 14 | 7 | 240 | 285 | 315 |

TABLE II

Solidifying ranges and boiling temperatures of zincated alkalies

| Composition | | | Completely solid | Completely liquid | Boiling point |
|---|---|---|---|---|---|
| NaOH | ZnO | H₂O | | | |
| Percent | Percent | Percent | °C. | °C. | °C. |
| 89 | 4 | 7 | 209 | 258 | 300 |
| 91.5 | 4 | 4.5 | 249 | 270 | 319 |
| 94 | 4 | 2 | 270 | 288 | Over 500 |

From data plotted in Figures I and II guides are established which are of great value in making that kind of product desired. From the boiling point curve, at any selected percentage of zinc oxide that temperature can be spotted which must not be exceeded, if the requisite water is to be retained in the melt. From the span between the curve representing the completely liquid condition and the curve representing the completely solid condition, the most favored composition range for conducting a flaking operation can be observed. That range in which the span of temperature difference in changing from the completely liquid condition to a completely solid condition is narrowest is the most favored condition. In flaking operations which inherently involve a rapid change from the liquid to a completely solid condition, a small reduction in the heat transfer which must be effected is very significant. Figure I shows that at a composition of 22–25% zinc oxide minimum temperature change is attained.

If after zinc oxide has passed into solution the temperature is allowed to rise too high whereby water is driven off, a precipitate is formed. Water also will be lost if the fusion is held too long. Two physical forms of crystals have been observed to separate; one, long needles colored yellow, the other, a tabular white hexagonal form. Crystals of the order of 1 mm. in size have been observed in both forms. Both appear by X-ray diffraction and analysis to be hexagonal zinc oxide. The crystals conform in many respects to the properties of the mineral zincite. Hence, this process set out herein may be applied to the production of zinc oxide in a particular physical condition or to the recovery of zinc oxide from roasted sulfide or other suitable ores of zinc.

It has been determined by various tests that if a melt of 300–400 lbs. containing 4% ZnO was to be held for 24–48 hours without excessive loss of water, the temperature should be held below 700° F., preferably at 650°–860° F. For larger batches temperatures of 630–650° F. is recommended. Then, too, the pot should be covered over by a close fitting lid to reduce the rate of evaporation of water.

In batches containing 4% ZnO, this oxide dissolved rapidly in the caustic melts, which contained 4.5% and 7% $H_2O$ respectively, but more slowly in the melt containing 2% $H_2O$. The batch containing 2% $H_2O$ would not boil at the maximum temperature reached, 500° C. (932° F.). One batch carried to this temperature was kept covered. No insoluble matter was formed; and the material upon cooling dissolved completely in water. Another batch carried to the same temperature was left open to the air. An insoluble precipitate slowly formed, indicating loss of water from the melt. Zinc oxide in amounts of 4% will not dissolve in anhydrous molten caustic at about the flaking temperature of caustic (680–735° F.).

The following examples will further illustrate the nature of this invention, but the invention is not restricted to these examples. Examples I–III are directed to the preparation of what we term high zincated alkalies, whereas Examples IV, V are on what we designate as low zincated alkalies, compositions containing 10% ZnO being taken arbitrarily as the dividing point. Example VI illustrates the preparation of the product with an alkali phosphate therein.

*Example I*

58 pounds of NaOH and 14 pounds of water were heated to 175° C. (347° F.) in a nickel tank. Then 28 pounds of ZnO was added gradually with stirring. When the ZnO was completely dissolved, requiring about one hour, the melt was run between 6″ diameter continuously chilled flaking squeeze rolls at such a rate that the liquid stood between the rolls about one inch deep. About 4 hours were required. The flake produced was thin, white and quite uniform.

It proved desirable to cool the flakes well below the temperature at which they were delivered from the particular small flaker employed to ensure adequate heat removal and completion of the crystallization process before accumulating them in quantity. Otherwise there was some tendency for the thin flakes to knit together and harden in masses.

*Example II*

182 pounds of water were placed in a 150 gallon fusion pot. Then 754 pounds of NaOH were added and this mixture heated with occasional stirring until all the caustic had dissolved, requiring 1¾ hours. The temperature was 147° C. (approx. 297° F.) at the end of this time. 364 pounds of ZnO were put in, while the temperature rose to 181° C. (approx. 358° F.). Heating of the mixture was continued with occasional stirring until the ZnO had all dissolved, taking care not to exceed the boiling point, which for this composition is about 228° C. (442° F.). This required 2 more hours giving a total time of 4 hours. The melt was poured into two 5' x 10' steel pans to cool. The pouring temperature was 217° C. (approx. 423° F.). The melt in the pans was allowed to cool and after it had become hard over night, it was broken up and once ground thru a production-size crusher. Most of the product readily passed an 8-mesh-to-the-inch screen, and was suitable for blending with other granual or crystalline materials such as caustic soda, trisodium phosphate anhydrous, sodium metasilicate, tetrasodium pyrophosphate for examples, or for direct solution in or preparation of alkaline liquors.

Example III

A zincated alkali batch of the calculated composition 64% NaOH, 24% ZnO and 12% $H_2O$ was made as follows:

1152 pounds of solid caustic soda were added to 216 pounds of water in a suitable fusion pot. The temperature was raised slowly after all the caustic was added. When virtually all the caustic soda was dissolved, assisted by stirring, and at a temperature of 150–160° C. (302–320° F.), 432 pounds of zinc oxide were stirred in as heating continued. When all the zinc oxide was brought into solution, the zincated alkali at 210° C. (410° F.) was fed to the pan of a water cooled flaking roll and flaked at a pan temperature of 206° C. (approx. 403° F.). The temperature of flakes delivered from the flaker was 110° C. (230° F.).

Example IV 288 grams of NaOH, 12 grams ZnO and 12 grams of $H_2O$ were heated to fusion in a nickel beaker over a gas burner. The ZnO dissolved in about 10 minutes to a clear melt. As soon as the fusion was complete the batches were poured through laboratory flaking rolls. White and dry flakes were obtained. They were found to be rapidly and completely soluble in water.

Example V

Several tons of a low zincated alkali containing about 4° ZnO content and about 2% $H_2O$ were made in full scale caustic production equipment. In making up the batch, sufficient 73% caustic liquor was added to the fused anhydrous caustic already in the pot to adjust the water content to 3.5–4.0%. Any suitable aqueous caustic liquor of greater water content can, of course, instead be dehydrated directly to this desired end point. The excess water above 2% helps to secure rapid solution of ZnO, and to insure the maintenance of the required minimum amount of $H_2O$. Before the 73% caustic was added, precaution was taken to make sure the temperature of the anhydrous fused NaOH was not above 800° F.

The calculated amount of ZnO was then added. The contents of the pot were stirred until all the ZnO was dissolved. The temperature was adjusted to between 630° F. and 650° F. and held there until settling of impurities was complete. When sufficiently settled, the temperature was raised slowly over about four hours, to about 700° F. and the upper contents of the pot were flaked on a regular caustic flaker wheel.

The flaked product was almost colorless and quickly and completely soluble in water, but for the presence of traces of normal and expected commercial impurities, oxides of iron being the principal contaminant.

Example VI

A silicated, phosphated, zincated alkali was made up from the following ingredients as directed:

| | Pounds | Percent |
|---|---|---|
| (1) Water glass, commercial, 42° Bé | 30 | 19.6 |
| (2) Water | 3 | 2.0 |
| (3) Caustic soda, solid | 90 | 58.8 |
| (4) Zinc oxide | 15 | 9.8 |
| (5) Tetrasodium pyrophosphate, anhydrous | 15 | 9.8 |
| | 153 | 100.0 |

(1) and (2) were mixed in a nickel kettle, (3) added and heat applied. After complete solution of the caustic, (4) was stirred in. The zinc oxide was brought entirely into solution at a maximum temperature of 216° C. (approx. 421° F.). This fusion was flowed as required directly to water cooled pressure flaking rolls accompanied by dry, finely divided (5) pyrophosphate at a steady rate. Flaking was controlled in a manner to incorporate the pyrophosphate in the flaked product essentially unaltered by reaction. Analysis showed 0.0% $P_2O_5$ in the form of orthophosphate. White, thin flakes were obtained of a desirable character.

In Example III certain advantages in the 24% ZnO composition over the 28% ZnO composition of Examples I and II were demonstrated, namely the production of a harder, drier flake less subject to plastic deformation under pressure and caking in the mass during final cooling and storage. This accords with theory based on the temperature relations set forth in Figure I, which shows that the temperature range for complete solidification appears to be narrowest at approximately 24% ZnO. It is highly advantageous that conversion of the liquid mass to solid form, free from liquid phase, be effected within the shortest practicable time and that the crystallization process be essentially completed within the few seconds contact with the flaking roll. Nevertheless the temperature relations set forth in Figure I, will afford sufficient guidance for one skilled in the arts of flaking and crystallization phenomena to prepare suitably hard, crystallized products over the range 4–30% zinc oxide content.

It will be seen that the compositions of Examples I and II are identical, differences residing in techniques of handling batches of varying sizes. Batches of widely different composition may be treated in accordance with the examples supplemented by the guidance of Figures I and II.

It is normally advantageous in connection with the casting and cooling process that chilling proceed as rapidly as practicable. This can be effected by such expedients as casting in thin masses, cooling by heat exchange, or in the ultimate, flaking in accordance with the teachings of Examples I, III and V. When heavy castings are allowed to cool slowly, crystallization of phases richer in alkali than the melt as a whole begins at the cooling surfaces, resulting in enrichment of the interior mass with respect to zinc oxide. Commercially this is undesirable, since a uniform end product can be had then only by comminution of the entire solidified mass followed by intimate re-mixing. Such operations are to be avoided in so far as practicable, since the dust of zincated alkalies and particularly of those higher in zinc oxide content is both very hygroscopic and irritating in comminuted form.

For bottle washing service, low zincated alkalies such as represented by Examples IV and V and containing ZnO to the approximate extent of 0.5–10% of the solid composition may be prepared by direct fusion followed by appropriate crystallization techniques as suggested by the various examples, or high zincated alkalies such as represented by Examples I, II and III, carrying upward of 10% zinc oxide may be prepared as an intermediate and mixed with appropriate amounts of caustic soda, soda ash, trisodium phosphate, tetrasodium pyrophosphate, sodium polyphosphates, sodium silicates, surface active agents or other appropriate materials in any desired manner to adapt them for use as bottle washing alkalies in particular, but not limited thereto (see for example U. S. Patent #1,719,056).

Alternatively, phosphates, carbonates and silicates or, in general, desired materials not adversely affected by temperatures of the fusion process, may be incorporated directly in the zincated fusion mixture at any time prior to solidification. It is desirable though not absolutely essential that such added materials dissolve completely in the melt. For example, tetrasodium pyrophosphate has been added to zincated alkali melts in the pot, in the flaking pan and also fed continuously with molten zincated alkalies to pressure type double roll flakers with good results. Other forms of phosphates, carbonates and silicates other than the alkali can be used by virtue of reactions which take place during the fusion step.

When pyrophosphate is added to melts in the pot a major percentage of the pyrophosphate is found to be converted to orthophosphate by reaction with the caustic content. This is disadvantageous when the objective is the retention of pyrophosphate as such in the product, but affords an economical means of introducing limited amounts of orthophosphate when desired. A small or even negligible degree of reversion may be secured by continuous feeding of pyrophosphate to the molten alkali pool of a double roll flaker.

The low zincated alkalies of Examples IV and V dissolve rapidly in water without decomposition. The products of Examples I, II and III dissolve in water with decomposition and separation of hydroxides or oxides of zinc. In general, however, the zincated alkalies may be dissolved readily and without decomposition in alkali metal hydroxide solutions to yield substantially clear solutions for use directly.

The zincated alkalies react with the hardness constituents of hard waters to precipitate a limited amount of flocculent material when dissolved therein. When using raw materials of commercial qualities and ordinary water supplies, a limited amount of such floc may be expected. Contamination of the melt by iron, nickel or other metals acquired from the fusion pots and further necessary apparatus, may under unfavorable circumstances contaminate and discolor the product and give rise to flocculation when brought into solution. It is advantageous, therefore, to utilize processes and equipment which minimize contamination.

Obviously many modifications may be made in the process described above without departing from the spirit and scope of the invention as defined in the appended claims.

We claim:

1. In the process of producing solid zincated alkalies in a medium of caustic alkali, the steps of dissolving zinc oxide in fused hydrous caustic alkali wherein the composition initially has a ratio of $ZnO:H_2O$ not greater than 2:1, contains not over 30% ZnO and falls within the approximate limits set out in the area bounded by points A, B, C and D of Figure III, preventing dehydration of the fused mass to the extent where ZnO separates from the melt, and thereafter effecting solidification thereof by cooling.

2. In the process of producing solid sodium zincate in a medium of caustic soda, the steps of dissolving zinc oxide in fused hydrous caustic soda wherein the composition initially has a ratio of $ZnO:H_2O$ not greater than 2:1, has not over 30% ZnO by weight and falls within the limits set out in the approximate area bounded by points A, B, C and D of Figure III, preventing dehydration of the fused mass to the extent that ZnO separates from the melt and thereafter effecting solidification thereof by cooling.

3. In the process of producing solid zincated alkalies in a medium of caustic alkali, the steps of dissolving zinc oxide in fused hydrous caustic alkali wherein the composition initially has a ratio of $ZnO:H_2O$ not greater than 2:1, has not over 30% ZnO and falls within the limits set out in the approximate area bounded by points A, B, C and D of Figure III, maintaining the temperature of the fused mass below 700° F. while preventing loss of water to the extent that ZnO separates from the melt, settling the mass, taking off the portion above the settlings and effecting solidification thereof by cooling.

4. In the process of producing solid zincated alkalies in a medium of caustic alkali, the steps of dissolving zinc oxide in fused hydrous caustic alkali wherein the composition initially has a ratio of $ZnO:H_2O$ not greater than 2:1, has not over 30% ZnO and falls within the limits set out in the approximate area bounded by points A, B, C and D of Figure III and preventing dehydration of the fused mass to the extent that ZnO separates from the melt, and incorporating at least one member of the group consisting of alkali metal phosphates, carbonates and silicates with the melt, and thereafter effecting solidification thereof by cooling.

5. In the process of producing solid zincated alkalies in a medium of caustic alkali, the steps of dissolving zinc oxide in fused hydrous caustic alkali wherein the composition initially has a ratio of $ZnO:H_2O$ not greater than 2:1, has not over 30% ZnO and falls within the limits set out in the approximate area A, B, C and D of Figure III and preventing dehydration of the fused mass to the extent that ZnO separates from the melt, and incorporating an alkali pyrophosphate immediately before solidification of the molten mass to prevent any appreciable degree of reversion of the pyrophosphate to orthophosphate, and thereafter effecting solidification by cooling.

6. In the process of producing solid zincated alkalies in a medium of caustic alkali, the steps of dissolving zinc oxide in fused hydrous caustic alkali wherein the composition initially has a ratio of $ZnO:H_2O$ not greater than 2:1, has not over 30% ZnO and falls within the limits set out in the approximate area A, B, C and D of Figure III and preventing dehydration of the fused mass to the extent that ZnO separates from the melt, flaking the molten mass and feeding an alkali pyrophosphate to the molten mass feeding the flaker immediately preceding the flaking step.

7. In the process of producing solid zincated alkalies of between about 24 and 28% ZnO content, the steps of adjusting the composition of the initial batch to contain the required 24 to 28% ZnO, water in the amount ranging from one-half of, to equal to the ZnO content, with the balance caustic soda, fusing the mixture at a temperature below its boiling point and without substantial dehydration, and effecting solidification by cooling.

8. In the process of producing solid zincated alkalies of about 4% ZnO content, the steps of adding about 4% ZnO to heated caustic soda containing 3.5–4% $H_2O$, stirring until substantially all of the ZnO is dissolved, holding the temperature at between 630 and 650° F. without substantial loss of water and until the settling of impurities is substantially complete, then separating off the liquid portion above the settlings, thereafter effecting solidification thereof by cooling.

9. The process set out in claim 8 wherein the temperature is raised to about 700° F., prior to the solidification.

10. The process of producing solid zincated alkalies of about 24% ZnO content by weight, the steps of fusing a mixture containing about 24% ZnO, about 12% $H_2O$ and the balance caustic soda at a temperature below the boiling point of the mixture and without substantial loss of water and thereafter effecting solidification thereof by cooling.

11. The process as defined in claim 1 wherein the solidification is accomplished by flaking.

12. The process as defined in claim 8 wherein the temperature is raised to about 700° F. prior to the solidification, and the solidification is accomplished by flaking.

WALTER F. WEGST.
LESLIE R. BACON.
RALPH McNABNEY.